United States Patent
Hoshino

(10) Patent No.: US 7,121,615 B2
(45) Date of Patent: Oct. 17, 2006

(54) JOINT CONSTRUCTION IN UPPER PART OF CENTER PILLAR

(75) Inventor: Masaharu Hoshino, Shizuoka-Ken (JP)

(73) Assignee: Suzuki Motor Corporation, (JP)

( * ) Notice: Subject to any disclaimer, the term of this patent is extended or adjusted under 35 U.S.C. 154(b) by 0 days.

(21) Appl. No.: 11/219,977

(22) Filed: Sep. 6, 2005

(65) Prior Publication Data

US 2006/0055209 A1  Mar. 16, 2006

(30) Foreign Application Priority Data

Sep. 10, 2004 (JP) .............................. 2004-263714

(51) Int. Cl.
*B62D 25/02* (2006.01)
*B62D 21/03* (2006.01)

(52) U.S. Cl. ..................... 296/203.03; 296/187.12; 296/193.06; 296/29

(58) Field of Classification Search ........... 296/203.01, 296/203.03, 193.05, 193.06, 193.12, 187.03, 296/187.12, 29, 204, 210
See application file for complete search history.

(56) References Cited

U.S. PATENT DOCUMENTS

| | | | | |
|---|---|---|---|---|
| 6,279,990 B1 * | 8/2001 | Miyasaka et al. | ...... | 296/203.03 |
| 6,322,135 B1 * | 11/2001 | Okana et al. | .......... | 296/203.03 |
| 6,328,376 B1 * | 12/2001 | Son | ........................ | 296/203.03 |
| 6,789,840 B1 * | 9/2004 | Honma et al. | ......... | 296/203.03 |
| 6,817,654 B1 * | 11/2004 | Kitagawa et al. | ...... | 296/187.03 |
| 6,976,730 B1 * | 12/2005 | Mally et al. | ........... | 296/203.03 |
| 2004/0212222 A1 * | 10/2004 | Katsuma | ................ | 296/203.03 |

FOREIGN PATENT DOCUMENTS

JP            9-109926 A      4/1997

* cited by examiner

*Primary Examiner*—D. Glenn Dayoan
*Assistant Examiner*—Greg Blankenship
(74) *Attorney, Agent, or Firm*—Lerner, David, Littenberg, Krumholz & Mentlik, LLP

(57) ABSTRACT

The present invention provides a joint construction in an upper part of a center pillar, in which a groove part 5 having a substantially U-shaped cross section, which is open upward and extends in the longitudinal direction of a vehicle 1, is provided in a joint portion between a roof panel 2 and a side body outer panel 3 of the vehicle 1, wherein a roof center member 6 is provided under the roof panel 2, and on the other hand, a rail side inner panel 12 and a center pillar reinforce 10 are provided in a center pillar upper portion D; a vehicle inside end part 10a of the center pillar reinforce 10 extends toward the upper inside of the vehicle 1, and is joined to the roof center member 6, the roof panel 2, and the side body outer panel 3 in the groove part 5; and the vehicle inside end part 10a of the center pillar reinforce 10 is provided so as to extend to a vehicle inside end portion 12a of the rail side inner panel 12.

4 Claims, 6 Drawing Sheets

JOINT CONSTRUCTION IN UPPER PART OF CENTER PILLAR

BACKGROUND OF THE INVENTION AND RELATED ART STATEMENT

1. Field of the Invention

The present invention relates to a joint construction in an upper part of a vehicular center pillar.

2. Description of Related Art

In an upper part of a vehicular center pillar, as shown in FIG. 8, a rail side portion formed by a side body outer panel 51, a rail side reinforce 52, and a rail side inner panel 53, a center pillar portion formed by a center pillar reinforce 54, a side body outer panel 51, and a center pillar inner panel 55, and a roof member portion formed by a roof center member 56 and a roof panel 57 are joined to each other (for example, refer to Patent Document 1). In a joint portion between the roof panel 57 and the side body outer panel 51, which is located in both right and left end parts of the roof panel 57, a groove part 57a having a substantially U-shaped cross section, which is open upward and extends in the longitudinal direction of a vehicle, is formed.

[Patent Document 1] Japanese Patent Provisional Publication No. 9-109926 (No. 109926/1997)]

Of these component members in the upper part of the center pillar, the rail side reinforce 52, the center pillar reinforce 54, and the roof center member 56 are formed by using members having a large sheet thickness for the purpose of increasing vehicle body strength. On the other hand, the side body outer panel 51, the rail side inner panel 53, the roof panel 57, and the like are formed by using members having a small sheet thickness for the purpose of reducing vehicle body weight.

However, the above-described conventional joint construction in the upper part of the center pillar is disadvantageous in terms of vehicle body strength because the center pillar reinforce 54 and the roof center member 56, which have a large sheet thickness, are separated from each other. Also, the conventional joint construction is disadvantageous in terms of vehicle body strength because spot welds in the groove part 57a of the roof panel 57 are made in a lapped portion of the roof center member 56 having a large sheet thickness and the side body outer panel 51 and the roof panel 57, which have a small sheet thickness.

OBJECT AND SUMMARY OF THE INVENTION

The present invention has been made in view of the above circumstances, and accordingly an object thereof is to provide a joint construction in an upper part of a center pillar, which is capable of increasing vehicle body strength and rigidity.

To solve the problems with the related art, the present invention provides a joint construction in an upper part of a center pillar, in which a groove part having a substantially U-shaped cross section, which is open upward and extends in the longitudinal direction of a vehicle, is provided in a joint portion between a roof panel and a side body outer panel of the vehicle, wherein a roof center member is provided under the roof panel, and on the other hand, a rail side inner panel and a center pillar reinforce are provided in a center pillar upper portion; a vehicle inside end part of the center pillar reinforce extends toward the upper inside of the vehicle, and is joined to the roof center member, the roof panel, and the side body outer panel in the groove part; and the vehicle inside end part of the center pillar reinforce is provided so as to extend to a vehicle inside end portion of the rail side inner panel.

Also, in the present invention, the vehicle inside end part of the center pillar reinforce is joined to a joint portion between the rail side inner panel and the vehicle inside end part of the rail side reinforce.

Further, in the present invention, the side body outer panel in a joint portion of the groove part is provided with a notch which has almost the same size as the roof center member and extends in the vehicle longitudinal direction.

Still further, in the present invention, a flange end part of the notch is located on the vehicle inside from a vehicle outside end of the groove part.

As described above, in the joint construction in an upper part of a center pillar in accordance with the present invention, in which the groove part having a substantially U-shaped cross section, which is open upward and extends in the longitudinal direction of the vehicle, is provided in the joint portion between the roof panel and the side body outer panel of the vehicle, the roof center member is provided under the roof panel, and on the other hand, the rail side inner panel and the center pillar reinforce are provided in the center pillar upper portion; the vehicle inside end part of the center pillar reinforce extends toward the upper inside of the vehicle, and is joined to the roof center member, the roof panel, and the side body outer panel in the groove part; and the vehicle inside end part of the center pillar reinforce is provided so as to extend to the vehicle inside end portion of the rail side inner panel. Therefore, the strength and rigidity of vehicle body can be increase.

Also, in the present invention, since the vehicle inside end part of the center pillar reinforce is joined to the joint portion between the rail side inner panel and the vehicle inside end part of the rail side reinforce, the vehicle body strength can further be increased.

Further, in the present invention, since the side body outer panel in a joint portion of the groove part is provided with a notch which has almost the same size as the roof center member and extends in the vehicle longitudinal direction, the weldability and workability of spot welding can be improved.

Still further, in the present invention, since the flange end part of the notch is located on the vehicle inside from the vehicle outside end of the groove part, the sealer applying workability is improved, and also the sealing ability can be enhanced.

DETAILED DESCRIPTION OF PREFERRED EMBODIMENTS

Figure 1:
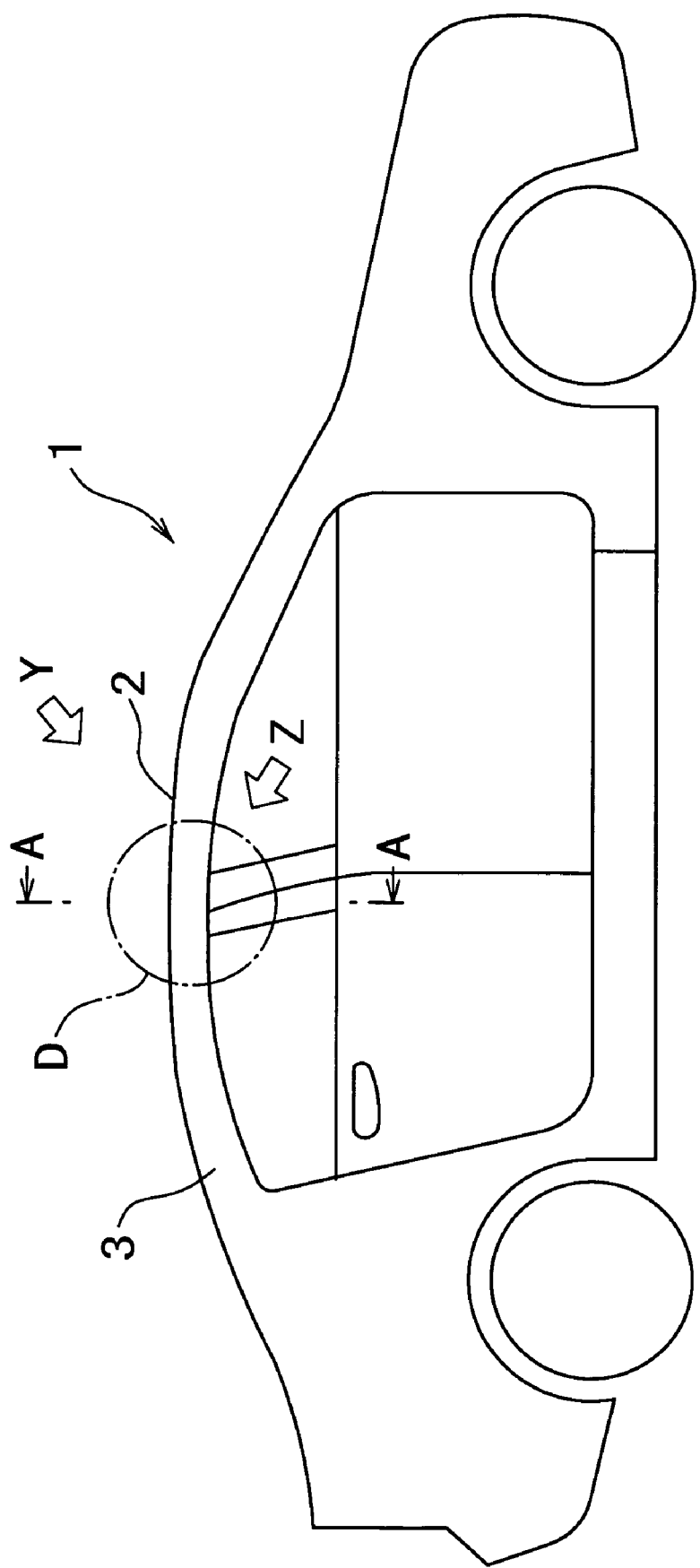
FIG. 1 is a side view showing the whole of a vehicle to which a joint construction in an upper part of a center pillar in accordance with an embodiment of the present invention is applied.

A joint construction in an upper part of a center pillar in accordance with the present invention will now be described in detail with reference to an embodiment shown in the accompanying drawings.

FIGS. 1 to 7 show an embodiment of a joint construction in an upper part of a center pillar in accordance with the present invention. A vehicle 1 to which the joint construction in an upper part of a center pillar of this embodiment is applied includes a roof panel 2 constituting a vehicle body roof and a side body outer panels 3 on both right and left sides, as shown in FIGS. 1 to 4. In addition, the roof panel 2 and the side body outer panels 3 are spot welded to each other in both right and left end parts of the vehicle body roof by using a spot welding gun 4, and in the joint portions, groove parts 5 each having a substantially U-shaped cross section, which are open upward and extend in the longitudinal direction of vehicle, are provided. These groove parts 5, which are provided to conduct rainwater etc. to the outside of a vehicle, are formed by bending both right and left end parts of the roof panel 2.

Figure 3:
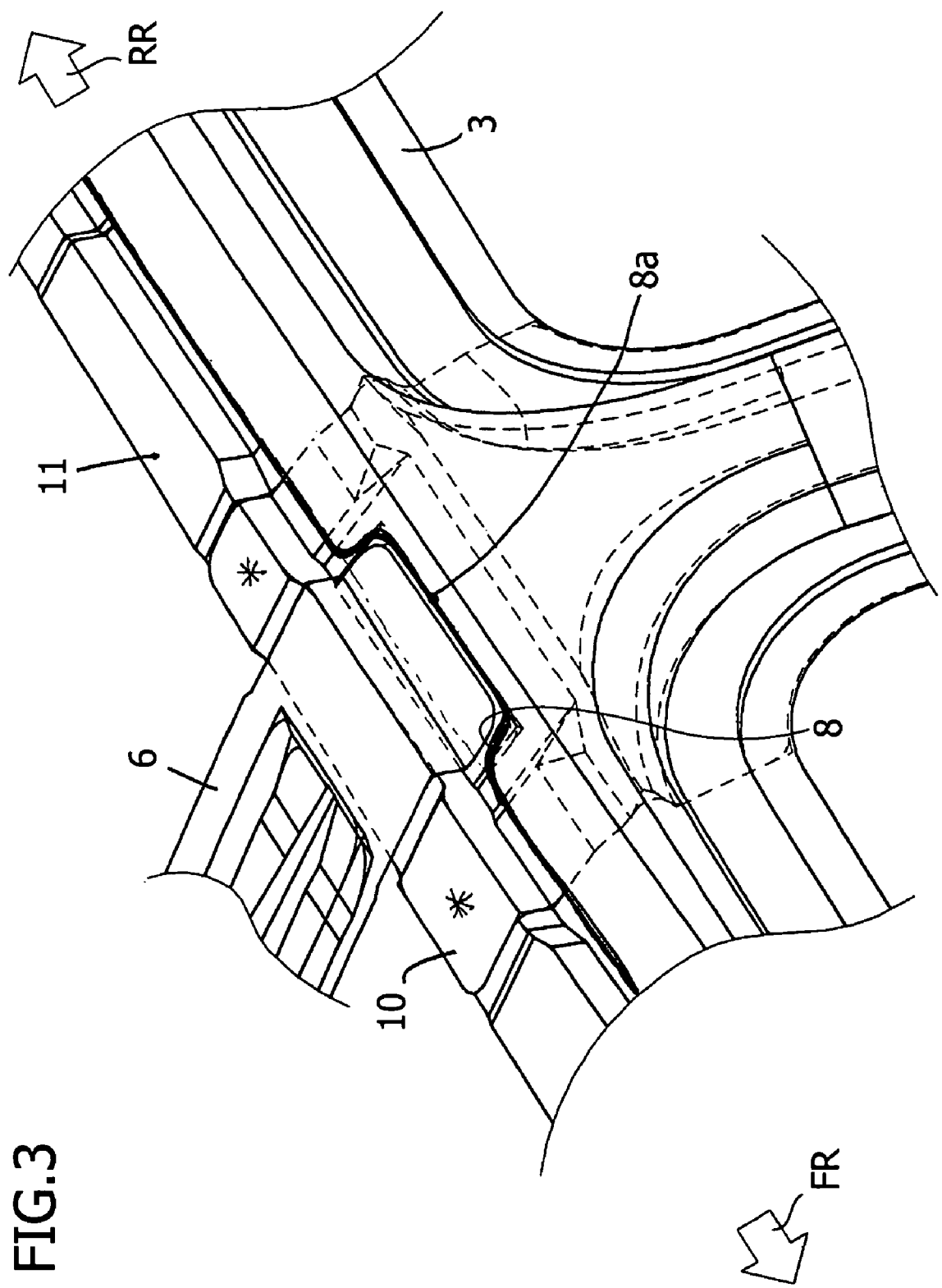
FIG. 3 is a perspective view showing an upper part of a center pillar on the outside of vehicle compartment viewed from the direction of arrow Y of FIG. 1.
Figure 4:
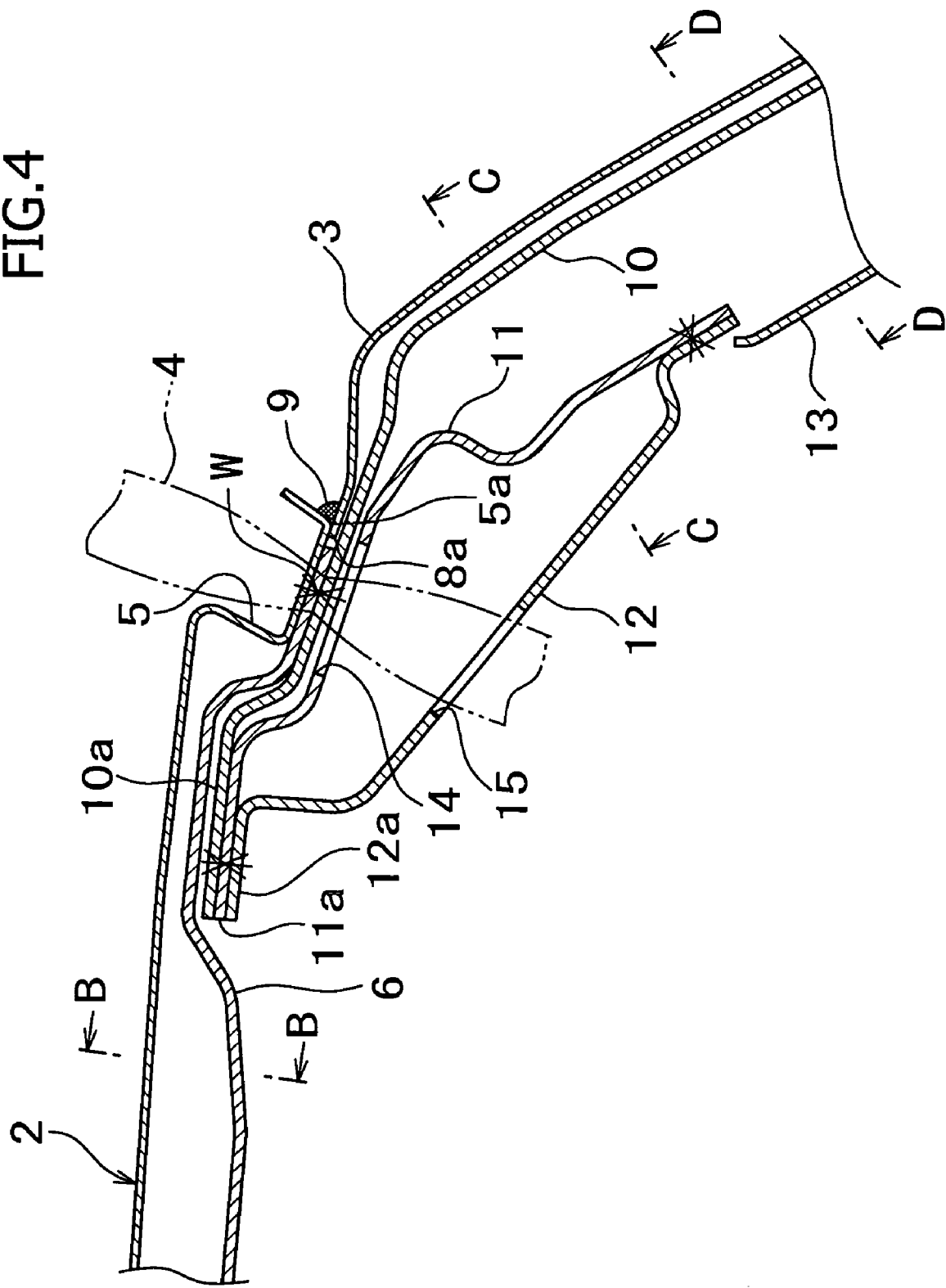
FIG. 4 is a sectional view taken along the line A—A of FIG. 1.
Figure 5:
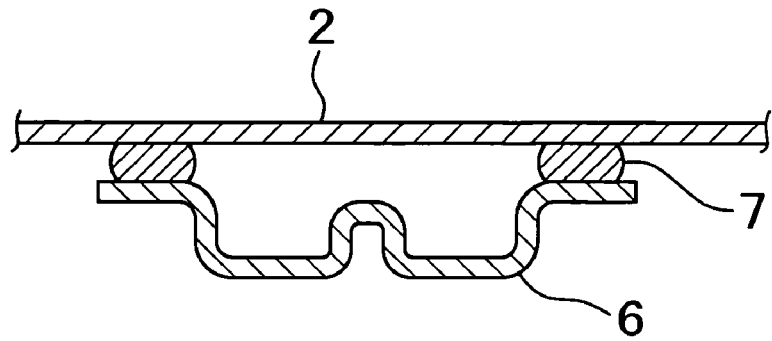
FIG. 5 is a sectional view taken along the line B—B of FIG. 4.

Under the roof panel 2, a roof center member 6 having a large sheet thickness is arranged along the vehicle width direction. As shown in FIG. 5, in an upper part of the vehicle body roof, the roof center member 6 is formed substantially into a hat shape in cross section, the opening thereof being directed upward. The front and rear flanges of the roof center member 6 are fixed to the lower surface of the roof panel 2 with an adhesive 7. On the other hand, as shown in FIGS. 3 and 4, in the joint portion of the groove part 5, the side body outer panel 3 having a small sheet thickness is provided with a notch 8, which has almost the same size as the roof center member 6 and extends in the vehicle longitudinal direction, so that a four-sheet spot weld, which provides poor weldability, is avoided by the presence of the notch 8. Moreover, a flange end part 8a of the notch 8 is located on the vehicle inside from a vehicle outside end 5a of the groove part 5 so that the applying work ability of a sealer 9 is not impaired.

Figure 6:
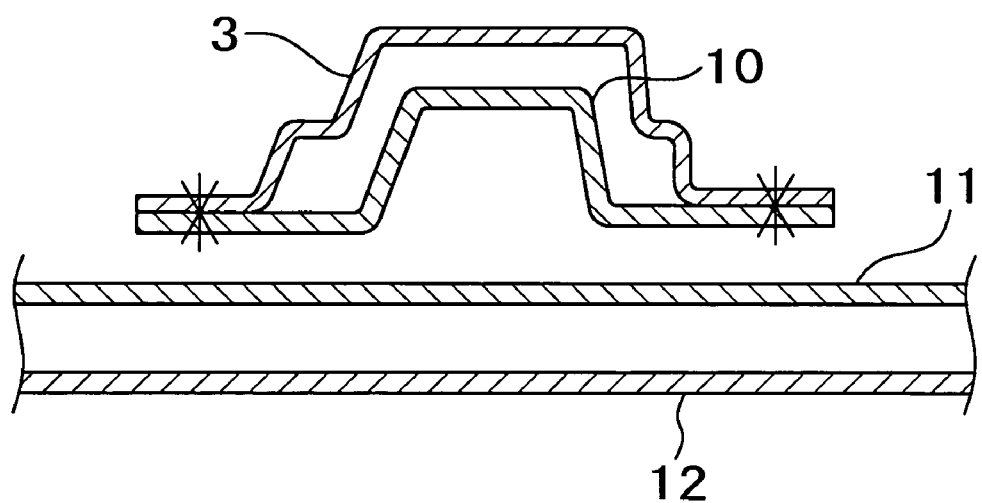
FIG. 6 is a sectional view taken along the line C—C of FIG. 4.

As shown in FIGS. 3 and 4, a center pillar reinforce 10 and a rail side reinforce 11, which have a large sheet thickness, and a rail side inner panel 12 and a center pillar inner panel 13 are arranged in an upper part of the center pillar at a lower position of the side body outer panel 3 and the roof center member 6. As shown in FIG. 6, in the upper part of the center pillar, the center pillar reinforce 10 is formed into a hat shape in cross section, the opening thereof being directed inward, and the front and rear flanges thereof are joined by welding to the front and rear flanges of the side body outer panel 3 having almost the same cross sectional shape as that of the center pillar reinforce 10 so that a closed cross section is formed.

Figure 7:
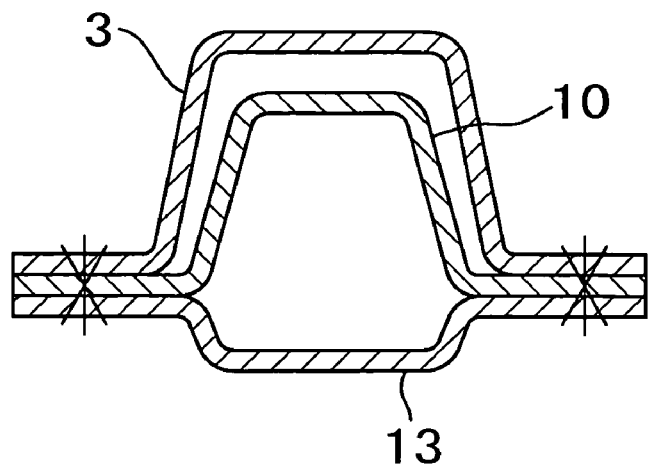
FIG. 7 is a sectional view taken along the line D—D of FIG. 4.

Moreover, as shown in FIG. 7, in an intermediate part of the center pillar as well, the center pillar reinforce 10 is formed substantially into a hat shape in cross section, the opening thereof being directed inward. The front and rear flanges thereof are joined by welding to the front and rear flanges of the side body outer panel 3 having almost the same cross sectional shape as that of the center pillar reinforce 10, and also are joined by welding to the front and rear flanges of the center pillar inner panel 13 substantially having a hat shape in cross section, the opening thereof being directed inward, so that a closed cross section is formed.

As shown in FIG. 4, a vehicle inside end part 10a of the center pillar reinforce 10 of this embodiment extends toward the upper inside of vehicle, and is joined to the roof center member 6, the roof panel 2, and the side outer panel 3 in the groove part 5. Further, the vehicle inside end part 10a of the center pillar reinforce 10 is provided so as extend to a vehicle inside end part 12a of the rail side inner panel 12 beyond the groove part 5, and is joined by welding to the joint portion of the vehicle inside end parts 12a and 11a of the rail side inner panel 12 and the rail side reinforce 11. Therefore, in the intermediate parts of the rail side reinforce 11 and the rail side inner panel 12, welding work holes 14 and 15 through which one of a pair of spot welding guns passes are provided at positions facing to spot welds W in the groove part 5 of the roof panel 2.

Figure 2:
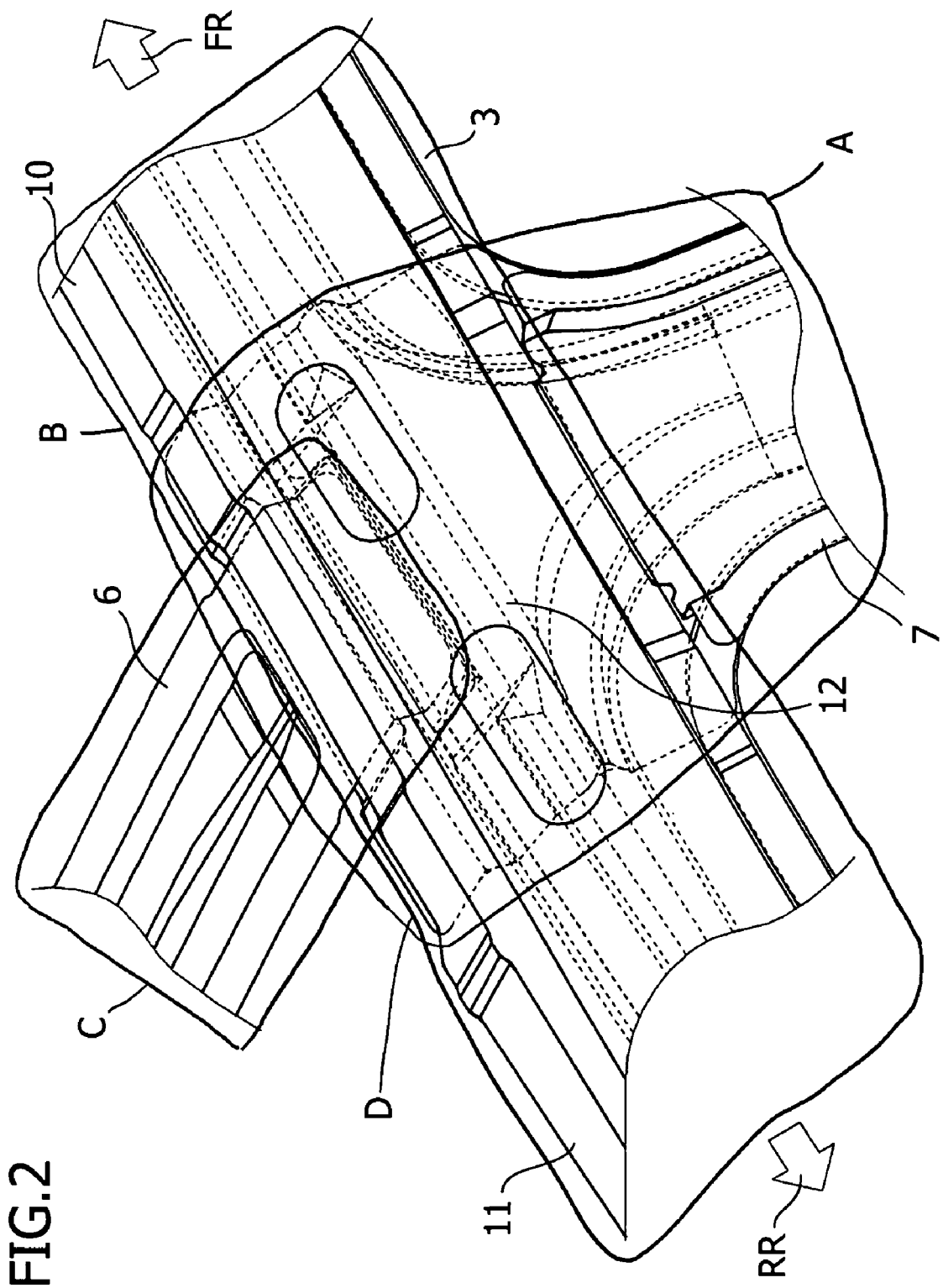
FIG. 2 is a perspective view showing an upper part of a center pillar on the inside of vehicle compartment viewed from the direction of arrow Z of FIG. 1.
Figure 8:
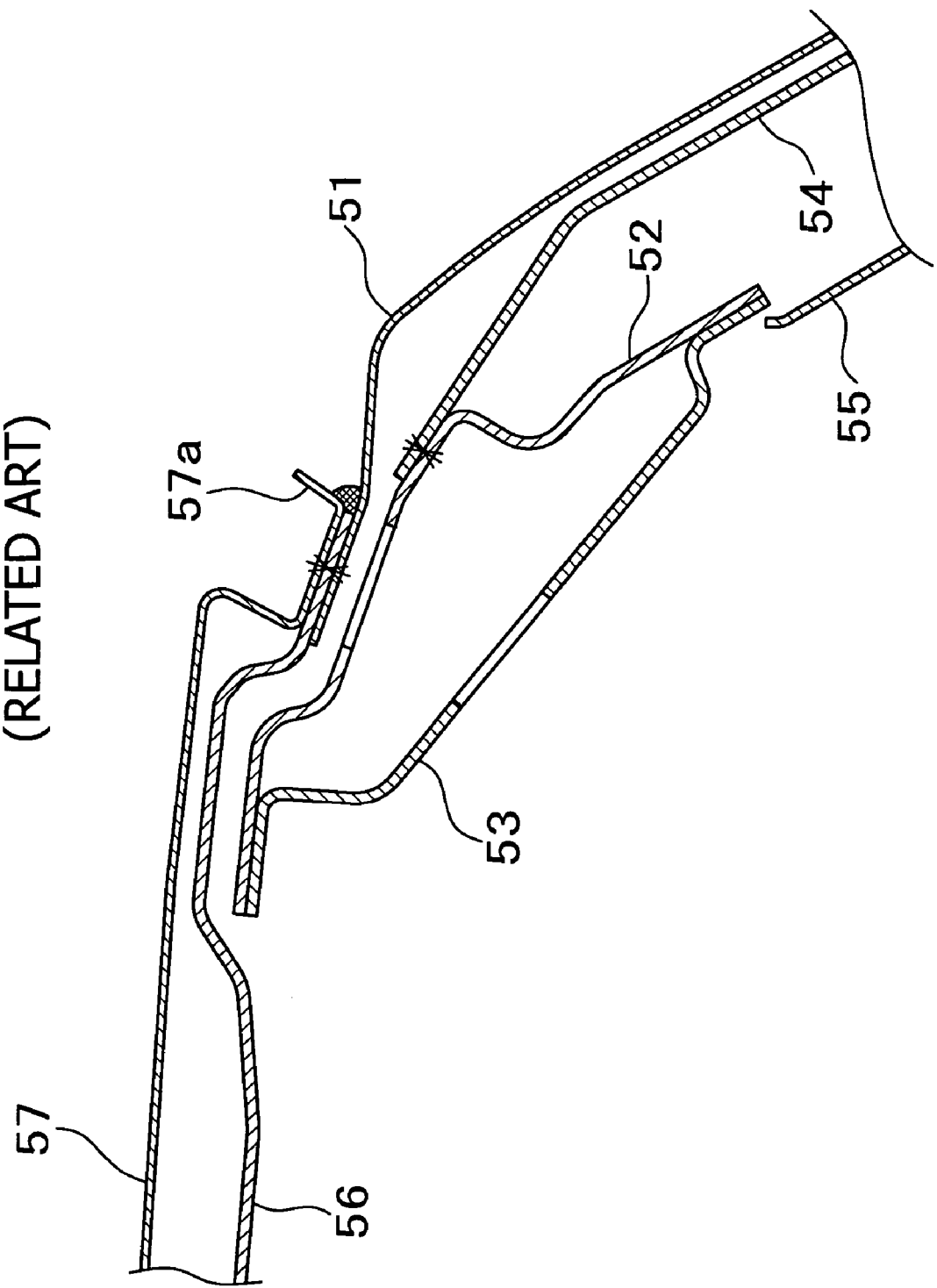
FIG. 8 is a sectional view of a conventional joint construction in an upper part of a center pillar.

Thus, in the joint construction of this embodiment, as shown in FIG. 2, although a center pillar portion A, a rail side portion B, a roof member portion C, and a center pillar upper portion D are joined to each other in the same way as shown in FIG. 8, the shape and arrangement of members constituting these portions and the objects being joined by welding are different from those in the conventional example. In FIGS. 2 and 3, the arrow FR indicates the front of vehicle, and the arrow RR indicates the rear of vehicle.

Specifically, in particular, the center pillar portion A and the center pillar upper portion D are formed by the center pillar reinforce 10, the side body outer panel 3, and the center pillar inner panel 13, and as shown in FIGS. 3 and 4, the vehicle inside end part 10a of the center pillar reinforce 10 extends to the vehicle inside end part 12a of the rail side inner panel 12 beyond the groove part 5, and the notch 8 is provided in the side body outer panel 3 in the joint portion of the groove part 5. The vehicle inside end part 10a of the center pillar reinforce 10 is joined to the roof center member 6, the roof panel 2, and the side body outer panel 3 in the groove part 5, and also is joined to the vehicle inside end parts 12a and 11a of the rail side inner panel 12 and the rail side reinforce 11. Therefore, in the center pillar upper portion D, the center pillar reinforce 10 having a large sheet thickness and the roof center member 6 having a large sheet thickness can be spot welded in the groove part 5 of the roof panel 2 without impairing the weldability of spot welding, so that the vehicle body strength can be increased surely.

The rail side portion B is formed by the side body outer panel 3, the rail side reinforce 11, and the rail side inner panel 12, and the roof member portion C is formed by the roof center member 6 and the roof panel 2.

The above is a description of an embodiment of the present invention. The present invention is not limited to the above-described embodiment, and various modifications and changes can be made based on the technical concept of the present invention.

The invention claimed is:

1. A joint construction in an upper part of a center pillar, in which a groove part having a substantially U-shaped cross section, which is open upward and extends in the longitudinal direction of a vehicle, is provided in a joint portion between a roof panel and a side body outer panel of the vehicle, wherein a roof center member is provided under the roof panel, and on the other hand, a rail side inner panel and a center pillar reinforce are provided in a center pillar upper portion; a vehicle inside end part of the center pillar reinforce extends toward the upper inside of the vehicle, and is joined to the roof center member, the roof panel, and the side body outer panel in the groove part; and the vehicle inside end part of the center pillar reinforce is provided so as to extend to a vehicle inside end portion of the rail side inner panel.

2. The joint construction in an upper part of a center pillar according to claim 1, wherein the vehicle inside end part of the center pillar reinforce is joined to a joint portion between the rail side inner panel and a vehicle inside end part of a rail side reinforce.

3. The joint construction in an upper part of a center pillar according to claim 1 or 2, wherein the side body outer panel in a joint portion of the groove part is provided with a notch which has almost the same size as the roof center member and extends in the vehicle longitudinal direction.

4. The joint construction in an upper part of a center pillar according to claim 3, wherein a flange end part of the notch is located on the vehicle inside from a vehicle outside end of the groove part.

* * * * *